(12) United States Patent
Basham et al.

(10) Patent No.: US 10,365,891 B2
(45) Date of Patent: Jul. 30, 2019

(54) OBJECT STORAGE SUPPORT FOR TIERED STORAGE ARCHIVE WITH REMOVABLE MEDIA

(71) Applicant: International Business Machines Corporation, Armonk, NY (US)

(72) Inventors: Robert B. Basham, Aloha, OR (US); Joseph W. Dain, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 377 days.

(21) Appl. No.: 15/092,462

(22) Filed: Apr. 6, 2016

(65) Prior Publication Data
US 2017/0293439 A1 Oct. 12, 2017

(51) Int. Cl.
| G06F 17/30 | (2006.01) |
| G06F 7/36 | (2006.01) |
| G06F 16/11 | (2019.01) |
| G06F 16/22 | (2019.01) |
| G06F 3/06 | (2006.01) |

(52) U.S. Cl.
CPC .............. *G06F 7/36* (2013.01); *G06F 3/061* (2013.01); *G06F 3/0608* (2013.01); *G06F 3/0614* (2013.01); *G06F 3/0647* (2013.01); *G06F 3/0686* (2013.01); *G06F 16/113* (2019.01); *G06F 16/2255* (2019.01)

(58) Field of Classification Search
CPC .... G06F 3/0619; G06F 3/0685; G06F 3/0649; G06F 17/30073; G06F 17/3033; G06F 7/36; G06F 16/113; G06F 16/2255; G06F 3/0647; G06F 3/0608; G06F 3/061; G06F 3/0614; G06F 3/0686
See application file for complete search history.

(56) References Cited

U.S. PATENT DOCUMENTS

| 7,831,793 | B2 | 11/2010 | Chakravarty et al. |
| 7,853,667 | B1 * | 12/2010 | Yoder ..................... G06F 3/061 |
| | | | 707/604 |
| 8,402,205 | B2 | 3/2013 | Goss et al. |
| 8,489,557 | B2 * | 7/2013 | Logan ............... G06F 17/30073 |
| | | | 707/671 |

(Continued)

OTHER PUBLICATIONS

Koltsidas et al., "Seamlessly Integrating Disk and Tape in a Multi-Tiered Distributed File System," 2015 IEEE 31st International Conference on Data Engineering (ICDE), 2015, pp. 1328-1339.

*Primary Examiner* — Greta L Robinson
(74) *Attorney, Agent, or Firm* — Zilka-Kotab, P.C.

(57) ABSTRACT

A computer-implemented method for indexing metadata which corresponds to data stored in a storage system, according to one embodiment, includes: identifying a subset of metadata stored in a first data store to archive in response to determining that an amount of metadata stored in the first data store has reached a threshold, identifying an index for storing information about the subset of the metadata, executing a sort operation on the subset of the metadata, generating index information corresponding to the subset of the metadata, writing the subset of the metadata to an archive medium, and recording the index information in the identified index. Other systems, methods, and computer program products are described in additional embodiments.

20 Claims, 12 Drawing Sheets

(56) References Cited

U.S. PATENT DOCUMENTS

| | | | |
|---|---|---|---|
| 9,020,892 B2 | 4/2015 | Chan et al. | |
| 9,223,597 B2 * | 12/2015 | Deshpande | G06F 9/45533 |
| 9,223,789 B1 * | 12/2015 | Seigle | G06F 17/30073 |
| 9,235,579 B1 * | 1/2016 | Suarez | G06F 17/30073 |
| 9,552,362 B2 * | 1/2017 | Borden | G06F 17/30097 |
| 9,864,764 B2 * | 1/2018 | Kraemer | G06F 17/30297 |
| 2011/0238906 A1 | 9/2011 | Amir et al. | |
| 2013/0185503 A1 | 7/2013 | Bhatta | |

* cited by examiner

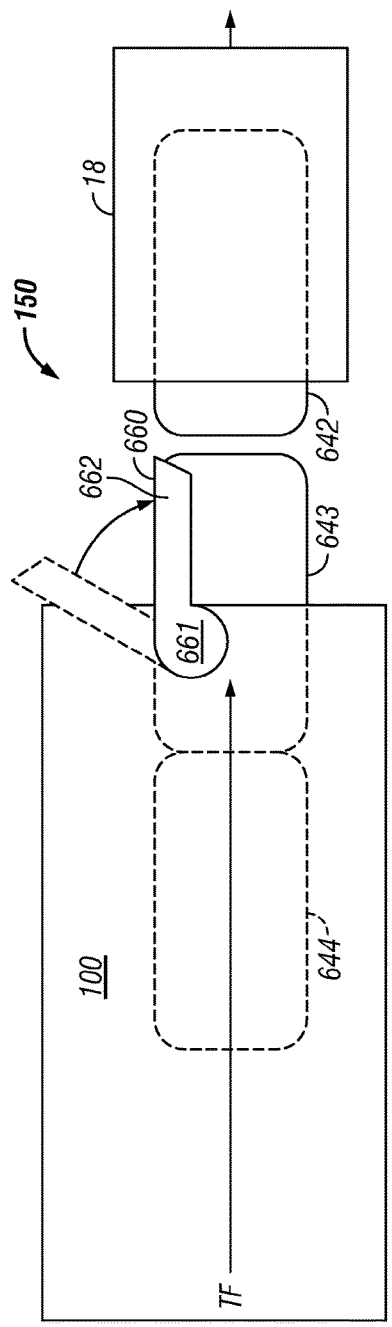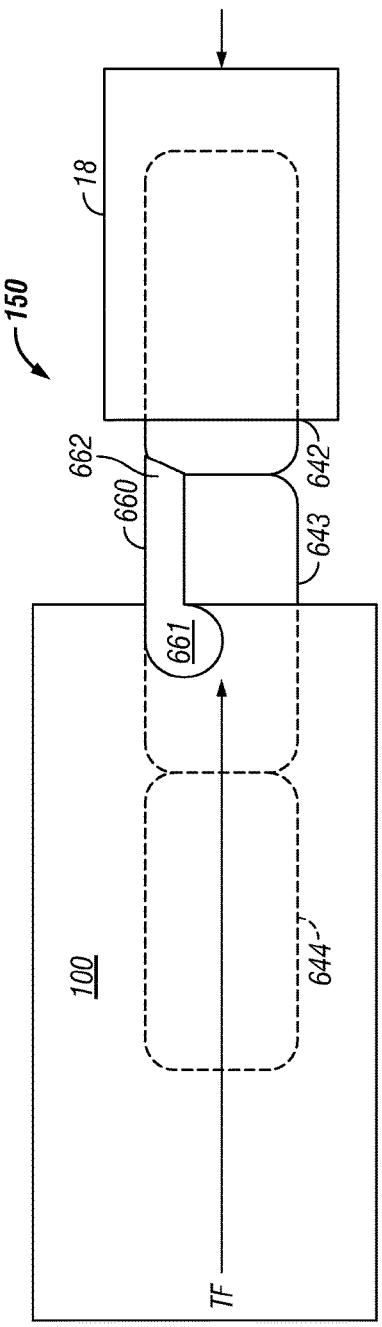

OBJECT STORAGE SUPPORT FOR TIERED STORAGE ARCHIVE WITH REMOVABLE MEDIA

BACKGROUND

The present invention relates to data storage systems, and more particularly, this invention relates to tape libraries having improved metadata indexing.

Automated data storage libraries are known for providing cost effective storage and retrieval of large quantities of data. The data in automated data storage libraries is typically stored on media of data storage cartridges that are, in turn, stored at storage slots or the like inside the library in a fashion that renders the media, and its resident data, accessible for physical retrieval. Such data storage cartridges are commonly termed "removable media." Data storage cartridge media may comprise any type of media on which data may be stored and which may serve as removable media, including but not limited to magnetic media (such as magnetic tape or disks), optical media (such as optical tape or disks), electronic media (such as PROM, EEPROM, flash PROM, CompactFlash™, Smartmedia™, Memory Stick™, etc.), or other suitable media. An example of a data storage cartridge that is widely employed in automated data storage libraries for mass data storage is a magnetic tape cartridge.

In addition to data storage media, automated data storage libraries typically comprise data storage drives that store data to, and/or retrieve data from, the data storage cartridge media. Further, automated data storage libraries typically comprise I/O stations at which data storage cartridges are supplied or added to, or removed from, the library. The transport of data storage cartridges between data storage slots, data storage drives, and I/O stations is typically accomplished by one or more accessors. Such accessors have grippers for physically retrieving the selected data storage cartridges from the storage slots within the automated data storage library and transporting such cartridges to the data storage drives by moving, for example, in the X and Y directions.

A magnetic tape may contain multiple files (data) written to the tape sequentially, in a linear fashion. Unlike hard drives or solid state nonvolatile storage such as nonvolatile memory (NVM), magnetic tapes do not allow direct-access write of data. In general, tape data is written linearly, in append-only mode. For example, the Linear Tape-Open (LTO) standard uses shingling to write tracks to increase tracks density. However, due to shingling, the in-place rewrite of a file or a data block stored in one track would essentially erase the data written in the neighboring track.

File management of data on tapes has traditionally been different from that of direct-access storage media. In the latter, file system data structures are commonly used, keeping information such as a hierarchical directory structure, file names, file attributes (e.g. size, access information, access rights permissions, etc.), a list of the physical storage blocks containing the file contents, etc. However, since such file system structures must be updated with information when changes are made to files stored on the media, such file system structures are not well-suited to tapes, which are not compatible with rewrites of the file system information, as mentioned above. While tape-based file system implementations do exist, reading the file system information includes positioning the tape to the end of the recorded data, while any update includes rewriting of a new copy of the entire set of file system structures at the end of the tape data.

SUMMARY

A computer-implemented method for indexing metadata which corresponds to data stored in a storage system, according to one embodiment, includes: identifying a subset of metadata stored in a first data store to archive in response to determining that an amount of metadata stored in the first data store has reached a threshold, identifying an index for storing information about the subset of the metadata, executing a sort operation on the subset of the metadata, generating index information corresponding to the subset of the metadata, writing the subset of the metadata to an archive medium, and recording the index information in the identified index.

A computer program product for recalling data stored in a storage system using indexed metadata, according to another embodiment, includes a computer readable storage medium having program instructions embodied therewith. The computer readable storage medium is not a transitory signal per se, and the program instructions executable by a computer to cause the computer to perform a method which includes: receiving, by the computer, a read request, determining, by the computer, whether metadata associated with data corresponding to the read request is located in a first data store, using, by the computer, index information associated with the read request to identify an archive medium which includes the metadata associated with data corresponding to the read request in response to determining that the metadata is not located in the first data store, receiving, by the computer, the metadata from the archive medium, using, by the computer, the metadata to identify a second medium having the data corresponding to the read request, and receiving, by the computer, the data corresponding to the read request from the second medium.

A system, according to yet another embodiment, includes: a processor and logic integrated with and/or executable by the processor, the logic being configured to: identify, by the processor, a subset of metadata stored in a first data store to archive in response to determining that an amount of metadata stored in the first data store has reached a threshold, identify, by the processor, an index for storing information about the subset of the metadata, execute, by the processor, a sort operation on the subset of the metadata, generate, by the processor, index information corresponding to the subset of the metadata, write, by the processor, the subset of the metadata to an archive medium, and record, by the processor, the index information in the identified index.

BRIEF DESCRIPTION OF THE DRAWINGS

FIGS. 8A-8D are partial side views of a cartridge blocking mechanism according to one embodiment.

DETAILED DESCRIPTION

Figure 1:
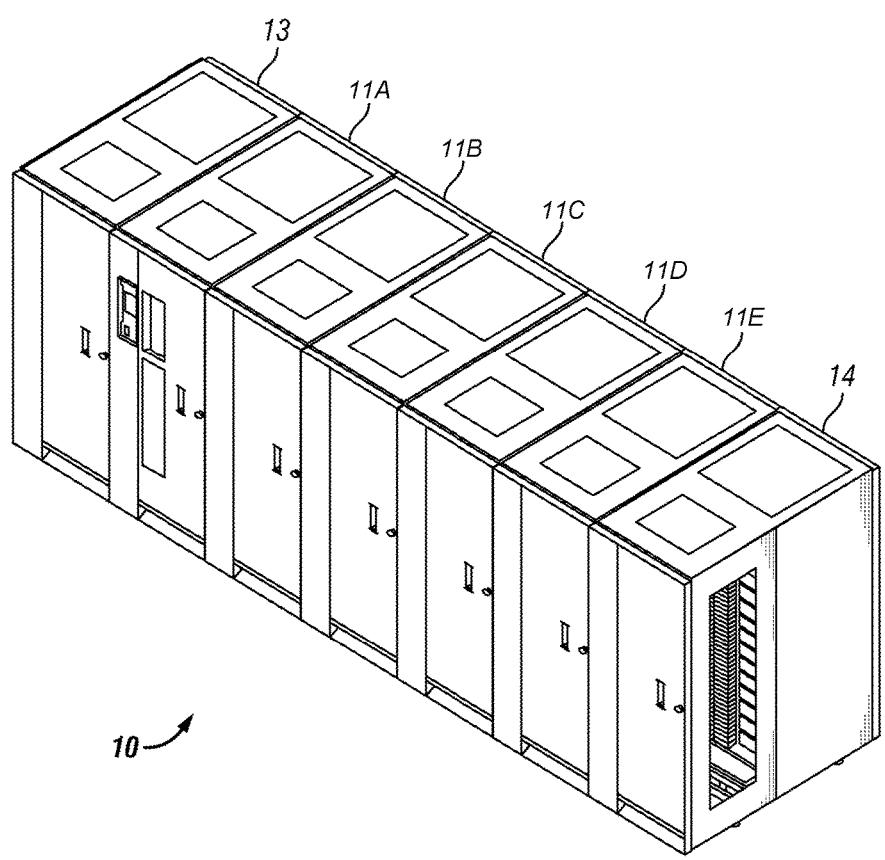
FIG. 1 is a perspective view of an automated data storage library according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof. Various embodiments described herein include tiered data storage schemes which efficiently integrate the storage of data on media positioned in a library and the storage of data on media positioned outside a library. More specifically, various embodiments included herein include data libraries having improved metadata indexing. By indexing the metadata which corresponds to data stored in a library, specific data may more efficiently be retrieved and read, e.g., upon request, as will be described in further detail below.

In one general embodiment, a computer-implemented method for indexing metadata which corresponds to data stored in a storage system, includes: identifying a subset of metadata stored in a first data store to archive in response to determining that an amount of metadata stored in the first data store has reached a threshold, identifying an index for storing information about the subset of the metadata, executing a sort operation on the subset of the metadata, generating index information corresponding to the subset of the metadata, writing the subset of the metadata to an archive medium, and recording the index information in the identified index.

In another general embodiment, a computer program product for recalling data stored in a storage system using indexed metadata, includes a computer readable storage medium having program instructions embodied therewith. The computer readable storage medium is not a transitory signal per se, and the program instructions executable by a computer to cause the computer to perform a method which includes: receiving, by the computer, a read request, determining, by the computer, whether metadata associated with data corresponding to the read request is located in a first data store, using, by the computer, index information associated with the read request to identify an archive medium which includes the metadata associated with data corresponding to the read request in response to determining that the metadata is not located in the first data store, receiving, by the computer, the metadata from the archive medium, using, by the computer, the metadata to identify a second medium having the data corresponding to the read request, and receiving, by the computer, the data corresponding to the read request from the second medium.

In another general embodiment, a system includes: a processor and logic integrated with and/or executable by the processor, the logic being configured to: identify, by the processor, a subset of metadata stored in a first data store to archive in response to determining that an amount of metadata stored in the first data store has reached a threshold, identify, by the processor, an index for storing information about the subset of the metadata, execute, by the processor, a sort operation on the subset of the metadata, generate, by the processor, index information corresponding to the subset of the metadata, write, by the processor, the subset of the metadata to an archive medium, and record, by the processor, the index information in the identified index.

Figure 2:
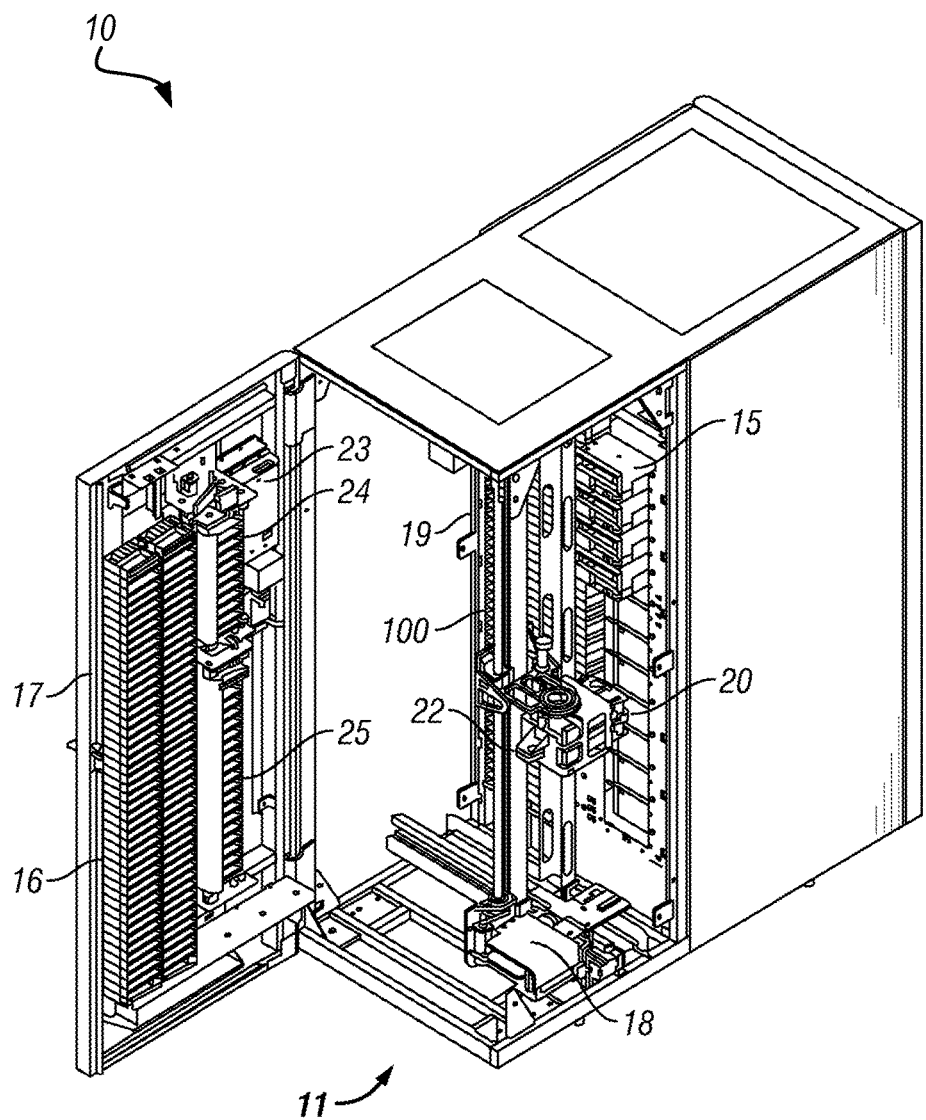
FIG. 2 is a perspective view of a storage frame from the data storage library of FIG. 1.

FIGS. 1-2 illustrate an automated data storage library 10 which stores and retrieves data storage cartridges, containing data storage media (not shown), from multi-cartridge deep slot cells 100 and single cartridge storage slots 16. An example of an automated data storage library which has a similar configuration as that depicted in FIGS. 1-2, and may be implemented with some of the various approaches herein is the IBM 3584 UltraScalable Tape Library. Moreover, it should be noted that references to "data storage media" herein refer to data storage cartridges, and for purposes of the present application, the two terms may be used synonymously.

The library 10 of FIG. 1 comprises a left hand service bay 13, one or more storage frames 11A, 11B, 11C, 11D, 11E, and right hand service bay 14. As will be discussed in further detail below, a frame may comprise an expansion component of the library. Thus, storage frames may be added or removed to expand or reduce the size and/or functionality of the library. According to different approaches, frames may include additional storage slots, deep slot cells, drives, import/export stations, accessors, operator panels, etc.

FIG. 2 shows an exemplary embodiment of a storage frame 11, which acts as the base frame of the library 10. Moreover, the storage frame 11 illustrated in FIG. 2 is contemplated to be a minimum configuration of the library 10, for which there is only a single accessor 18 (i.e., there are no redundant accessors) and no service bay. However, in other embodiments, a storage frame may include multiple robotic accessors and/or service bays.

Looking to FIG. 2, the library 10 is arranged for accessing data storage media in response to commands from at least one external host system (not shown). The library 10 includes a plurality of storage slots 16 on front wall 17 and a plurality of multi-cartridge deep slot cells 100 on rear wall 19, both of which may be used to storing data storage cartridges that may contain data storage media. According to one approach, the storage slots 16 are configured to store a single data storage cartridge, and the multi-cartridge deep slot cells 100 are configured to store a plurality of data storage cartridges. In a preferred approach, the multi-cartridge deep slot cells may be arranged in sequential order of tiers from front to rear (e.g., see FIG. 7A).

With continued reference to FIG. 2, the storage frame 11 of the library 10 also includes at least one data storage drive 15, e.g., for reading and/or writing data with respect to the data storage media. Additionally, a first accessor 18 may be used to transport data storage media between the plurality of storage slots 16, the multi-cartridge deep slot cells, and/or the data storage drive(s) 15. According to various approaches, the data storage drives 15 may be optical disk drives, magnetic tape drives, or other types of data storage drives as are used to read and/or write data with respect to the data storage media.

As illustrated, the storage frame 11 may optionally include an operator panel 23 or other user interface, such as a web-based interface, which allows a user to interact with the library 10. The storage frame 11 may also optionally comprise an upper I/O station 24 and/or a lower I/O station 25, thereby allowing data storage cartridges to be added (e.g., inserted) to the library inventory and/or removed from the library without disrupting library operation. Furthermore, the library 10 may have one or more storage frames 11, each having storage slots 16, preferably accessible by the first accessor 18.

As described above, the storage frames 11 may be configured with different components depending upon the intended function. One configuration of storage frame 11 may comprise storage slots 16 and/or multi-cartridge deep slot cells 100, data storage drive(s) 15, and other optional components to store and retrieve data from the data storage cartridges. However, in another approach, a storage frame 11 may include storage slots 16 and/or multi-cartridge deep slot cells 100 and no other components. The first accessor 18 may have a gripper assembly 20, e.g., for gripping one or more data storage media, in addition to having a bar code scanner 22 or other reading system, such as a cartridge memory reader or similar system mounted on the gripper assembly 20, to "read" identifying information about the data storage media.

Figure 3:
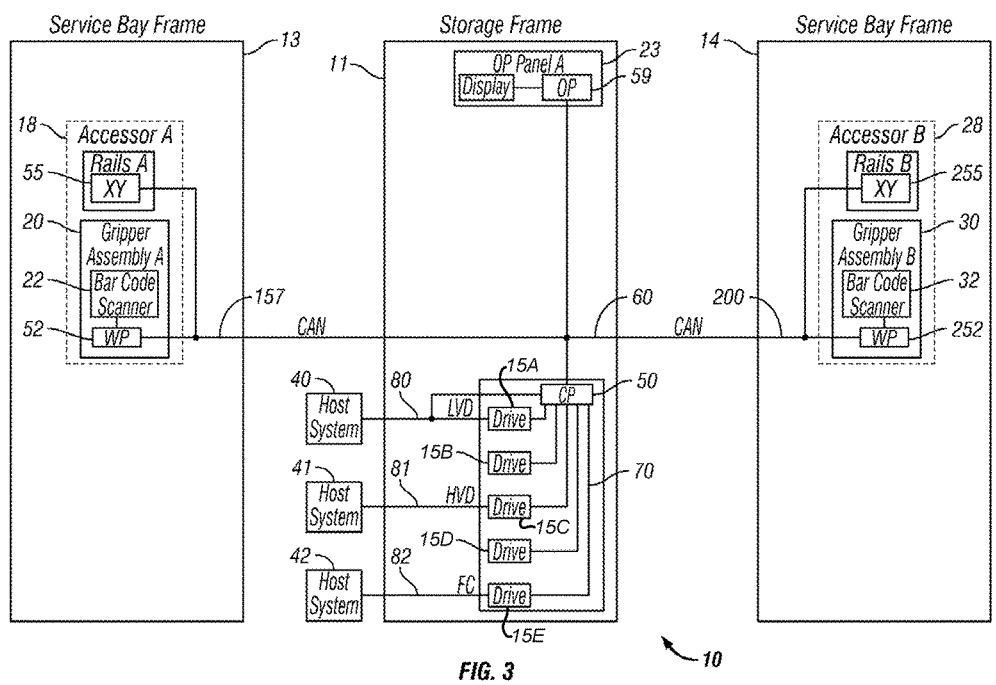
FIG. 3 is a block diagram of an automated data storage library according to one embodiment.

FIG. 3 depicts an automated data storage library 10, in accordance with one embodiment. As an option, the present automated data storage library 10 may be implemented in conjunction with features from any other embodiment listed herein, such as those described with reference to the other FIGS. Of course, however, such automated data storage library 10 and others presented herein may be used in various applications and/or in permutations which may or may not be specifically described in the illustrative embodiments listed herein. Further, the automated data storage library 10 presented herein may be used in any desired environment. Thus FIG. 3 (and the other FIGS.) should be deemed to include any and all possible permutations Referring now to FIG. 3, the automated data storage library 10 as described in reference to FIGS. 1 and 2, is depicted according to one embodiment. According to a preferred approach, the library 10 may employ a controller, e.g., arranged as a distributed system of modules with a plurality of processor nodes.

In one approach, the library is controlled, not by a central controller, but rather, by a distributed control system for receiving logical commands and converting the commands to physical movements of the accessor and gripper, and for operating the drives in accordance with the desired physical movements. The distributed control system may also provide logistical support, such as responding to host requests for element status, inventory, library status, etc. The specific commands, the conversion of those commands to physical movements, and the operation of the drives may be of a type known to those of skill in the art.

While the automated data storage library 10 has been described as employing a distributed control system, various other approaches described and/or suggested herein may be implemented in automated data storage libraries regardless of control configuration, such as, but not limited to, an automated data storage library having one or more library controllers that are not distributed.

Referring still to FIG. 3, the library 10 may have one or more storage frames 11, a left hand service bay 13 and a right hand service bay 14. The left hand service bay 13 is shown with a first accessor 18, where, as discussed above, the first accessor 18 may include a gripper assembly 20 and/or a reading system 22 to "read" identifying information about the data storage media depending on the desired embodiment. Furthermore, the right hand service bay 14 is shown having a second accessor 28, which includes a gripper assembly 30 and may also include a reading system 32 to "read" identifying information about the data storage media.

According to one approach, in the event of a failure or other unavailability of the first accessor 18, or its gripper assembly 20, etc., the second accessor 28 may perform some or all of the functions of the first accessor 18. Thus in different approaches, the two accessors 18, 28 may share one or more mechanical paths, they may have completely independent mechanical paths, or combinations thereof. In one example, the accessors 18, 28 may have a common horizontal rail with independent vertical rails to travel therealong. Moreover, it should be noted that the first and second accessors 18, 28 are described as first and second for descriptive purposes only and this description is not meant to limit either accessor to an association with either the left hand service bay 13, or the right hand service bay 14.

In an exemplary embodiment which is in no way intended to limit the invention, the first and second accessors 18, 28 may preferably move their grippers in at least two directions, called the horizontal "X" direction and vertical "Y" direction, e.g., to retrieve and grip, deliver and release, load and unload, etc. the data storage cartridge at the storage slots 16, multi-cartridge deep slot cells 100, data storage drives 15A, 15B, 15C, 15D, 15E, etc.

With continued reference to FIG. 3, library 10 receives commands from one or more host systems 40, 41, 42. The host systems 40, 41, 42, such as host servers, communicate with the library directly, e.g., on line 80, through one or more control ports (not shown), or through one or more data storage drives 15A, 15B, 15C, 15D, 15E on paths 81, 82. Thus, in different approaches, the host systems 40, 41, 42 may provide commands to access particular data storage cartridges and move the cartridges, for example, between the storage slots 16 and the data storage drives 15A, 15B, 15C, 15D, 15E. The commands are typically logical commands identifying the cartridges or cartridge media, and/or logical locations for accessing the media. Furthermore, it should be noted that the terms "commands" and "work requests" are used interchangeably herein to refer to such communications from the host system 40, 41, 42 to the library 10 as are intended to result in accessing particular data storage media within the library 10 depending on the desired approach.

According to one embodiment, the library 10 may be controlled by a library controller. Moreover, in various approaches, the library controller may include a distributed control system receiving the logical commands from hosts, determining the required actions, and/or converting the actions to physical movements of the first and/ or second accessor 18, 28. In another approach, the distributed control system may have a plurality of processor nodes, each having one or more computer processors. According to one example of a distributed control system, a communication processor node 50 may be located in a storage frame 11. The communication processor node provides a communication link for receiving the host commands, either directly or through the drives 15A, 15B, 15C, 15D, 15E, via at least one external interface, e.g., coupled to line 80.

Still referring to FIG. 3, the communication processor node 50 may additionally provide a line 70 (e.g., communication link) for communicating with the data storage drives 15A, 15B, 15C, 15D, 15E. As illustrated, the communication processor node 50 may preferably be located in the storage frame 11, e.g., close to the data storage drives 15A, 15B, 15C, 15D, 15E. Furthermore, one or more additional work processor nodes may be provided to form an exemplary distributed processor system, which may comprise, e.g., a work processor node 52 located at first accessor 18, and that is coupled to the communication processor node 50 via a network 60, 157. According to different approaches, each work processor node may respond to received commands that are broadcast thereto from any communication processor node, and the work processor nodes may also direct the operation of the accessors, e.g., providing move commands. An XY processor node 55 may be provided and may be located at an XY system of first accessor 18. As illustrated, the XY processor node 55 is coupled to the network 60, 157, and is responsive to the move commands, operating the XY system to position the gripper assembly 20.

Also, an operator panel processor node 59 may be provided at the optional operator panel 23 for providing an interface for communicating between the operator panel and the communication processor node 50, the work processor nodes 52, 252, and the XY processor nodes 55, 255.

A network 60, for example comprising a common bus, is provided, coupling the various processor nodes. The network may comprise a robust wiring network, such as the commercially available Controller Area Network (CAN) bus system, which is a multi-drop network, having a standard access protocol and wiring standards, for example, as defined by CiA, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

As illustrated in FIG. 3, the communication processor node 50 is coupled to each of the data storage drives 15A, 15B, 15C, 15D, 15E of a storage frame 11, via lines 70, and are thereby communicating with the drives 15A, 15B, 15C, 15D, 15E and with host systems 40, 41, 42. Alternatively, the host systems 40, 41, 42 may be directly coupled to the communication processor node 50, at line 80 for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 3, lines 80 and 81 (e.g., host connections) are intended to be SCSI busses. However, path 82 may be a bus which comprises an example of a Fibre Channel bus which is a high speed serial data interface, allowing transmission over greater distances than the SCSI bus systems.

According to some approaches, the data storage drives 15A, 15B, 15C, 15D, 15E may be in close proximity to the communication processor node 50, and may employ a short distance communication scheme, such as SCSI, or a serial connection, such as RS-422. Thus the data storage drives 15A, 15B, 15C, 15D, 15E may be individually coupled to the communication processor node 50 by lines 70. Alternatively, the data storage drives 15A, 15B, 15C, 15D, 15E may be coupled to the communication processor node 50 through one or more networks, such as a common bus network.

Furthermore, additional storage frames 11 may be provided, whereby each is preferably coupled to the adjacent storage frame. According to various approaches, any of the additional storage frames 11 may include communication processor nodes 50, storage slots 16, data storage drives 15A, 15B, 15C, 15D, 15E, networks 60, etc.

Moreover, as described above, the automated data storage library 10 may comprise a plurality of accessors. A second accessor 28, for example, is shown in a right hand service bay 14 of FIG. 3. The second accessor 28 may include a gripper assembly 30 for accessing the data storage media, and an XY system 255 for moving the second accessor 28. The second accessor 28 may run on the same horizontal mechanical path as the first accessor 18, and/or on an adjacent (e.g., separate) path. Moreover the illustrative control system additionally includes an extension network 200 which forms a network coupled to network 60 of the storage frame(s) 11 and to network 157 of left hand service bay 13.

In FIG. 3 and the accompanying description, the first and second accessors are associated with the left hand service bay 13 and the right hand service bay 14 respectively. However, this is for illustrative purposes and there may not be an actual association. Thus, according to another approach, network 157 may not be associated with the left hand service bay 13 and network 200 may not be associated with the right hand service bay 14. Moreover, depending on the design of the library, it may not be necessary to have a left hand service bay 13 and/or a right hand service bay 14 at all.

An automated data storage library 10 typically comprises one or more controllers to direct the operation of the automated data storage library. Moreover, host computers and data storage drives typically include similar controllers. A library controller may take many different forms and may comprise, for example, but is not limited to, an embedded system, a distributed control system, a personal computer, a workstation, etc. The term "library controller" as used herein is intended in its broadest sense as a device that includes at least one processor, and optionally further circuitry and/or logic, for controlling and/or providing at least some aspects of library operations.

Figure 4:
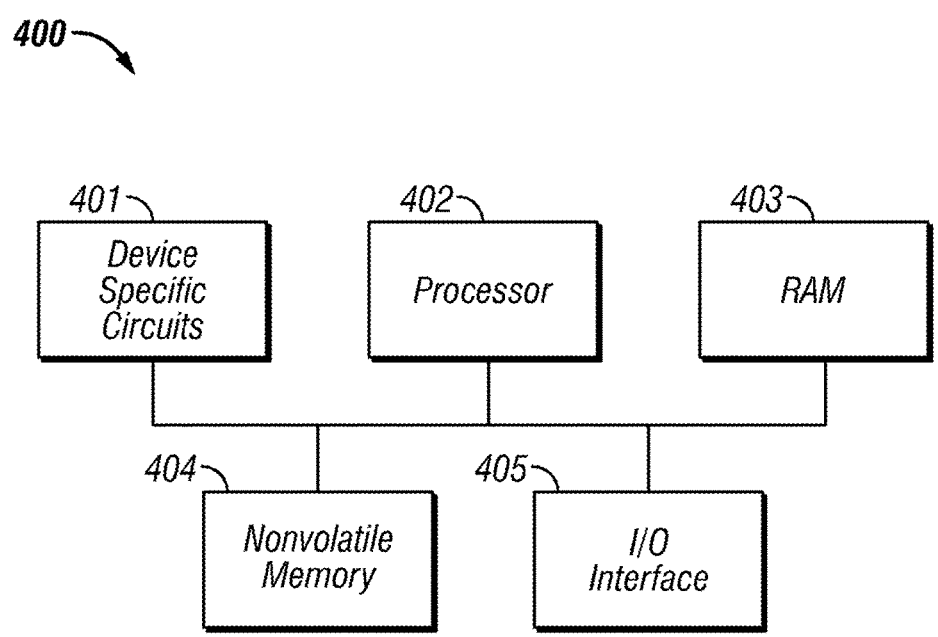
FIG. 4 is a block diagram depicting a controller configuration according to one embodiment.

Referring now to FIG. 4, a typical controller 400 is shown with a processor 402, Random Access Memory (RAM) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, Field Programmable Gate Array (FPGA), Application Specific Integrated Circuit (ASIC), discrete logic, etc. The RAM 403 is typically used to hold variable data, stack data, executable instructions, etc.

According to various approaches, the nonvolatile memory 404 may comprise any type of nonvolatile memory such as, but not limited to, Electrically Erasable Programmable Read Only Memory (EEPROM), flash Programmable Read Only Memory (PROM), battery backup RAM, hard disk drives, etc. However, the nonvolatile memory 404 is typically used to hold the executable firmware and any nonvolatile data. Moreover, the I/O interface 405 comprises a communication interface that allows the processor 402 to communicate with devices external to the controller. Examples may comprise, but are not limited to, serial interfaces such as RS-232, USB (Universal Serial Bus) or Small Computer Systems Interface (SCSI). The device specific circuits 401 provide additional hardware to enable the controller 400 to perform unique functions including, but not limited to, motor control of a cartridge gripper. Moreover, the device specific circuits 401 may include electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

While the automated data storage library 10 is described as employing a distributed control system, the various approaches described and/or suggested herein may be implemented in various automated data storage libraries regardless of control configuration, including, but not limited to, an automated data storage library having one or more library controllers that are not distributed. Moreover, a library controller may comprise one or more dedicated controllers of a library, depending on the desired embodiment. For example, there may be a primary controller and a backup controller. In addition, a library controller may comprise one or more processor nodes of a distributed control system. According to one example, communication processor node 50 (e.g., of FIG. 3) may comprise the library controller while the other processor nodes (if present) may assist the library controller and/or may provide backup or redundant functionality. In another example, communication processor node 50 and work processor node 52 may work cooperatively to form the library controller while the other processor nodes (if present) may assist the library controller and/or may provide backup or redundant functionality. Still further, all of the processor nodes may comprise the library controller. According to various approaches described and/or suggested herein, a library controller may have a single processor or controller, or it may include multiple processors or controllers.

Figure 5A:
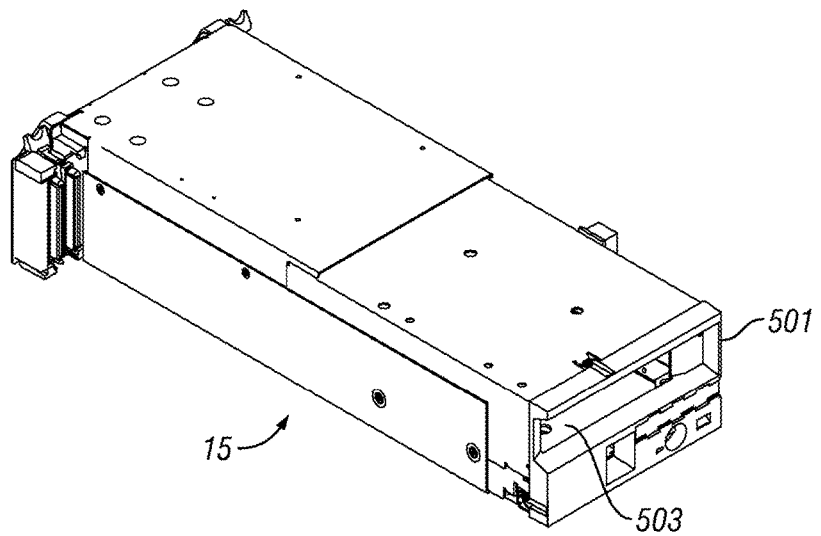
FIG. 5A is a frontal perspective view of a data storage drive according to one embodiment.
Figure 5B:
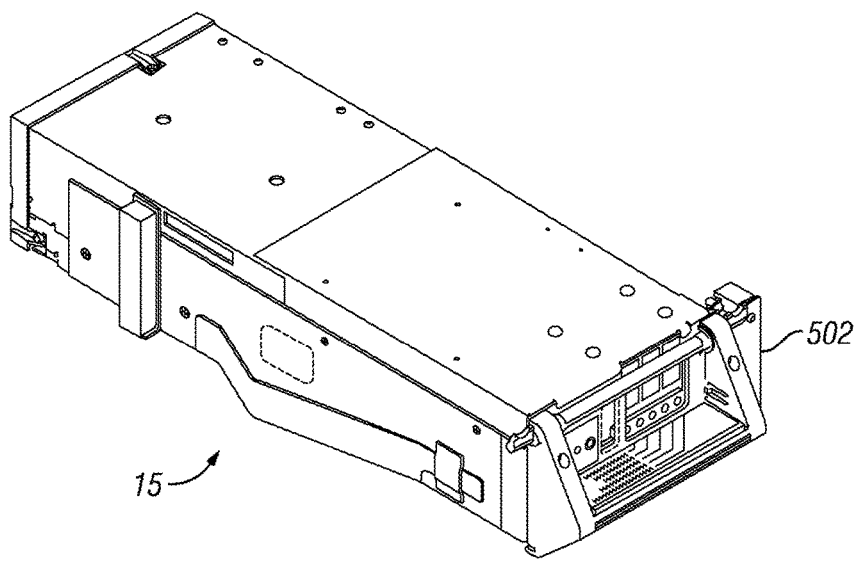
FIG. 5B is a rear perspective view of the data storage drive of FIG. 5A.

FIGS. 5A-5B illustrate the front 501 and rear 502 views of a data storage drive 15, according to one embodiment. In the example depicted in FIGS. 5A-5B, the data storage drive 15 comprises a hot-swap drive canister, which is in no way intended to limit the invention. In fact, any configuration of data storage drive may be used whether or not it includes a hot-swap canister. As discussed above, a data storage drive 15 is used to read and/or write data with respect to the data storage media, and may additionally communicate with a memory which is separate from the media, and is located within the cartridge. Thus, according to one approach, a data storage cartridge may be placed into the data storage drive 15 at opening 503.

Figure 6:
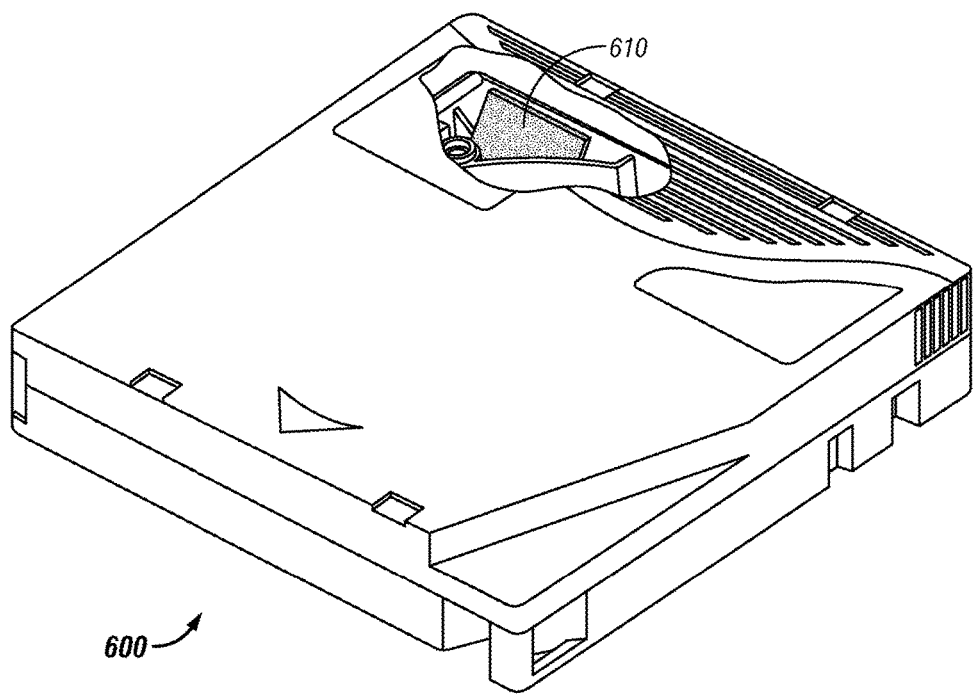
FIG. 6 is perspective view of a data storage cartridge having a cutaway portion, according to one embodiment.

Furthermore, FIG. 6 illustrates an embodiment of a data storage cartridge 600 with a cartridge memory 610 shown in a cutaway portion of the Figure, which is in no way intended to limit the invention. In fact, any configuration of data storage cartridge may be used whether or not it comprises a cartridge memory. According to various approaches, media of the data storage cartridge media may include any type of media on which data may be stored, including but not limited to magnetic media, e.g., magnetic tape, disks, etc.; optical media, e.g., optical tape, disks, etc.; electronic media, e.g., PROM, EEPROM, flash PROM, CompactFlash™, Smartmedia™, Memory Stick™, etc.; etc., or other suitable media. Moreover, an example of a data storage cartridge that is widely employed in automated data storage libraries for mass data storage is a magnetic tape cartridge in which the media is magnetic tape.

Figure 7A:
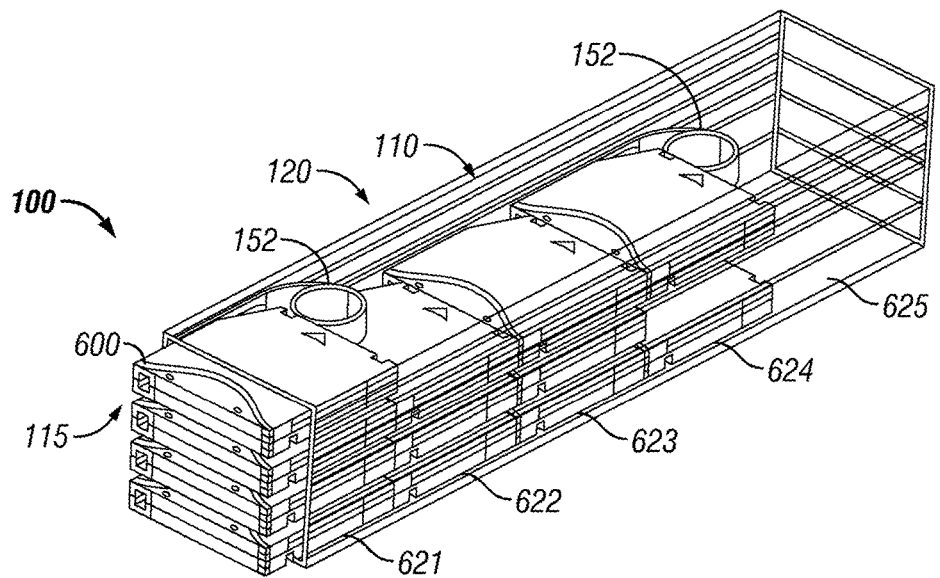
FIGS. 7A-7B are perspective views of a multi-cartridge deep slot cell according to one embodiment.
Figure 7B:
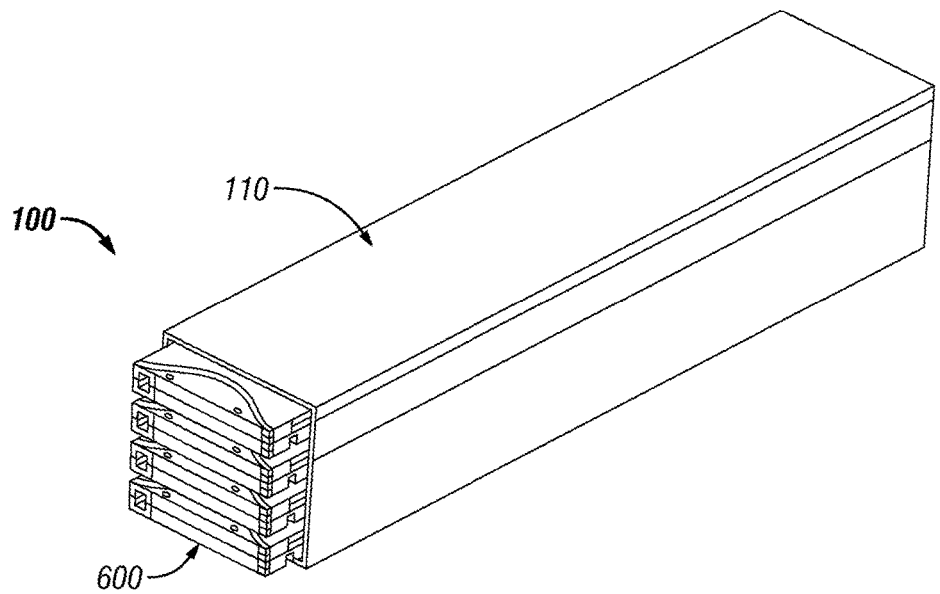

Looking now to FIGS. 7A-7B, a multi-cartridge deep slot cell 100 having biasing springs 152 is depicted according to one embodiment. As shown in the illustrative embodiment, the multi-cartridge deep slot cell 100 comprises a housing 110 defining an interior space 115. Furthermore, a plurality of storage slots 120 is disposed within the housing, and may be configured for storing up to a plurality of data storage cartridges 600, depending on the desired approach. Alternatively, the multi-cartridge deep slot cell 100 may be built into the frame of the automated data storage library according to one approach.

FIGS. 8A-8D illustrate an embodiment of a cartridge blocking mechanism 150 having a retaining gate 660 that retains the data storage cartridges in the multi-cartridge deep slot cell 100 according to one embodiment. As illustrated, according to one approach, the retaining gate 660 may be externally attached to a multi-cartridge deep slot cell 100, relative to a front opening of the multi-cartridge deep slot cell 100, whereby the retaining gate 660 can be activated by an accessor 18, e.g., of an automated tape library. Moreover, the retaining gate 660 allows for positive cartridge retention against the pressure of biasing springs (see 152 of FIGS. 7A-7B), and ensures that one or more data storage cartridges do not get pushed out of the multi-cartridge deep slot cell 100 simultaneously, while allowing the pushing mechanism (not shown) of the multi-cartridge deep slot cell 100 to continuously push data storage cartridge(s) to the opening in a multi-cartridge deep slot cell 100. Thus, according to one approach, the accessor 18 may open the retaining gate to gain access to the data storage cartridge in tier 1 and, upon its extraction, the biasing spring 152 moves the cartridge(s) positioned behind the extracted cartridge forward, thereby promoting the cartridge(s) by one tier as will soon become apparent.

Figure 8A:
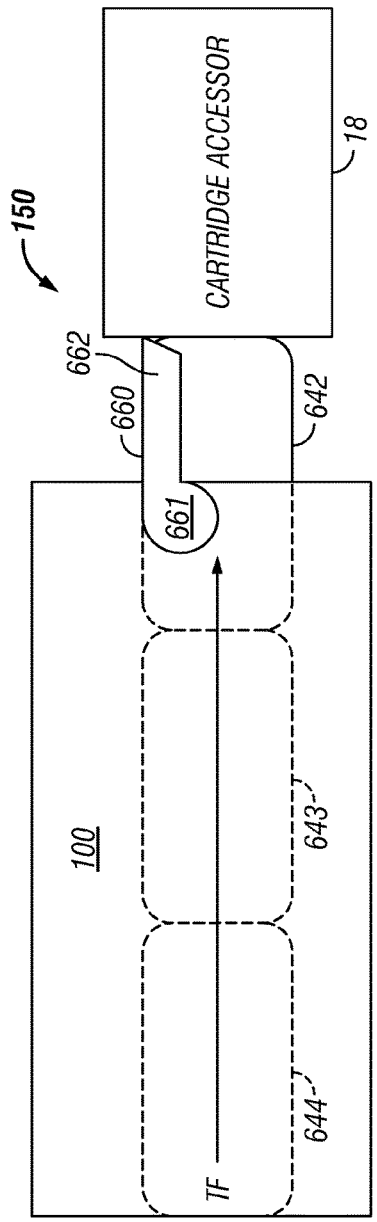

The basic working of the retaining gate is that the gate prevents the data storage cartridge(s) from being pushed out of a multi-cartridge deep slot cell 100. For example, as shown in FIGS. 8A-8D, a retaining gate 660 can be lifted by, for example, accessor 18 or by a front storage cartridge 642 for cartridge removal from/insertion into a multi-cartridge deep slot cell 100. Specifically, retaining gate 660 has a pivoting arm 661 mounted on multi-cartridge deep slot cell 100 via a pivoting post (not shown) that can be integral to a construction of multi-cartridge deep slot cell 100. Pivoting arm 661 is located below a catch 662 of retaining gate 660 whereby a thrust force TF through data storage cartridge 644-642 caused by the pushing mechanism (not shown) of multi-cartridge deep slot cell 100 causes retaining gate 660 to stay closed in a retaining position as shown in FIG. 8A. Moreover, the retaining gate 660 is preferably biased such that it closes in the downward direction over the front opening of multi-cartridge deep slot cell 100. This constant biasing may be achieved via gravity as shown in FIG. 8A or by implementing a spring force, e.g., attached to retaining gate 660 (not shown).

For removal of front storage cartridge 642 by accessor 18 from multi-cartridge deep slot cell 100, retaining gate 660 must be lifted upward to a releasing position whereby catch 662 of retaining gate 660 is disengaged from front storage cartridge 642. This can be seen in FIG. 8B where accessor 18 interfaces with retaining gate 660 by providing a lifting force. Once retaining gate 660 is lifted to the releasing position and accessor 18 is engaged with storage cartridge 642, accessor 18 can pull storage cartridge 642 out of multi-cartridge deep slot cell 100 and into accessor 18 without any interference of retaining gate 660 as shown in FIG. 8C. In view of storage cartridges 644 and 643 being stored in multi-cartridge deep slot cell 100, retaining gate 660 must return to its retaining position to prevent storage cartridges 644 and 643 from being ejected from multi-cartridge deep slot cell 100 by the thrust force TF of the pushing mechanism (not shown). During extraction of front storage cartridge 642 through the front opening of multi-cartridge deep slot cell 100, the retaining gate 660, which is being biased downward, moves back to the retaining position to engage storage cartridge 643.

Figure 8B:
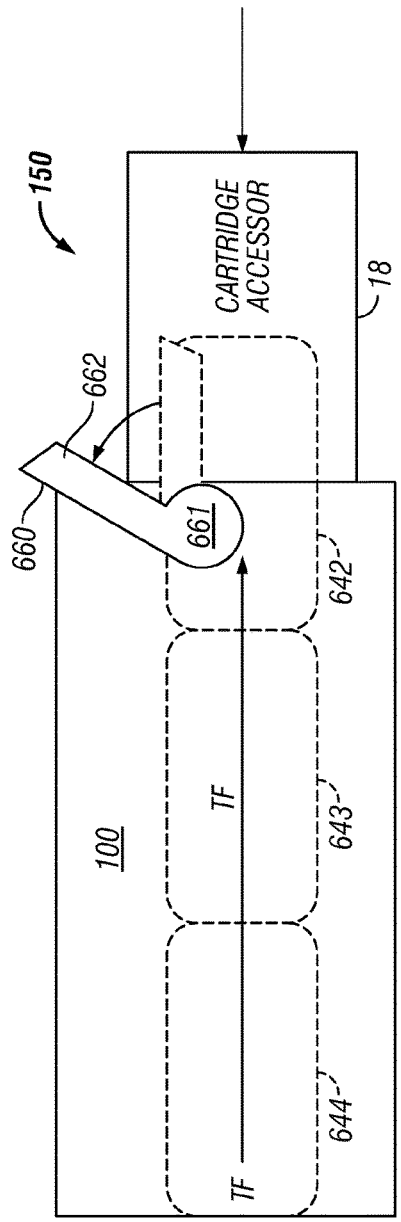

Once front storage cartridge 642 is extracted and storage cartridges 643 and 644 are retained from being pushed out of multi-cartridge deep slot cell 100, retaining gate 660 has successfully completed its cartridge retrieval process. Now retaining gate 660 demonstrates its ability to work for cartridge insertion into multi-cartridge deep slot cell 100. When accessor 18 begins to insert storage cartridge 642 back into multi-cartridge deep slot cell 100, retaining gate 660 is lifted to its releasing position to allow storage cartridge 642 through the front opening of multi-cartridge deep slot cell 100. Catch 662 of retaining gate 660 interfaces with a rear portion of storage cartridge 642, in particular a beveled surface of catch 662 as shown in FIG. 8D, whereby retaining gate 660 is lifted to its releasing position as shown in FIG. 8B due to storage cartridge 642 being pushed in multi-cartridge deep slot cell 100 by accessor 18. In doing so, storage cartridges 644, 643 are pushed deeper into multi-cartridge deep slot cell 100 by storage cartridge 642 in multi-cartridge deep slot cell 100 by accessor 18. Thus, the accessor is able to provide a force greater than the thrust force TF antiparallel thereto, to overcome the directional biasing of the storage cartridges 644, 643. Upon full insertion into multi-cartridge deep slot cell 100, retaining gate 660 moves to its retaining position to engage storage cartridge 642 as shown in FIG. 8A.

Thus, looking to various embodiments presented herein, access to a storage slot may include the ability to remove a cartridge from a storage slot, the ability to place a cartridge into a storage slot, or combinations thereof.

According to an exemplary embodiment, the storage slots from top to bottom are considered to be in parallel and comprise the same tier. Moreover, the storage slots from front to back, in a particular row, are considered to be in series and comprise sequential tiers.

Referring back to FIGS. 7A-7B, in accordance with one embodiment, storage slots 120 are depicted as being configured for storing up to a plurality of data storage cartridges 600, and arranged in sequential order of tiers 621, 622, 623, 624, 625 from front to rear. It should be noted that the frontmost tier 621 is also called "tier 1", while the next tier 622 is called "tier 2", etc., and the last tier 625 is also called the "rearmost" tier. However, referring to FIG. 2, in one embodiment, the single cartridge storage slots 16 are also termed "tier 0".

Referring again to FIGS. 1-3, according to one embodiment, the controller of automated data storage library 10 may operate the accessor(s) 18, 28 to selectively extract, place and/or transport data storage cartridges with respect to the multi-cartridge deep slot cells 100 and/or other elements of the automated data storage library 10. For example, the controller may facilitate extracting a cartridge from a multi-cartridge deep slot cell 100, transporting the cartridge to a data storage drive 15 and placing the cartridge in the drive 15. The controller may then extract the cartridge from the data storage drive 15, while directing the accessor to transport the cartridge to a specific multi-cartridge deep slot cell 100, and place the cartridge therein.

In one embodiment, one or more data storage cartridges may be added into the library, e.g., at an I/O station 24, 25, whereby the controller of the automated data storage library 10 may then operate the accessor(s) 18, 28 to transport the cartridge(s) to specific multi-cartridge deep slot cell(s) 100, and place the cartridge(s) therein. Similarly, the controller may operate the accessor(s) to selectively extract, place and transport data storage cartridges with respect to the single cartridge storage slots 16, and/or transport inserted or added cartridge(s) to specific single cartridge storage slots 16.

Figure 9:
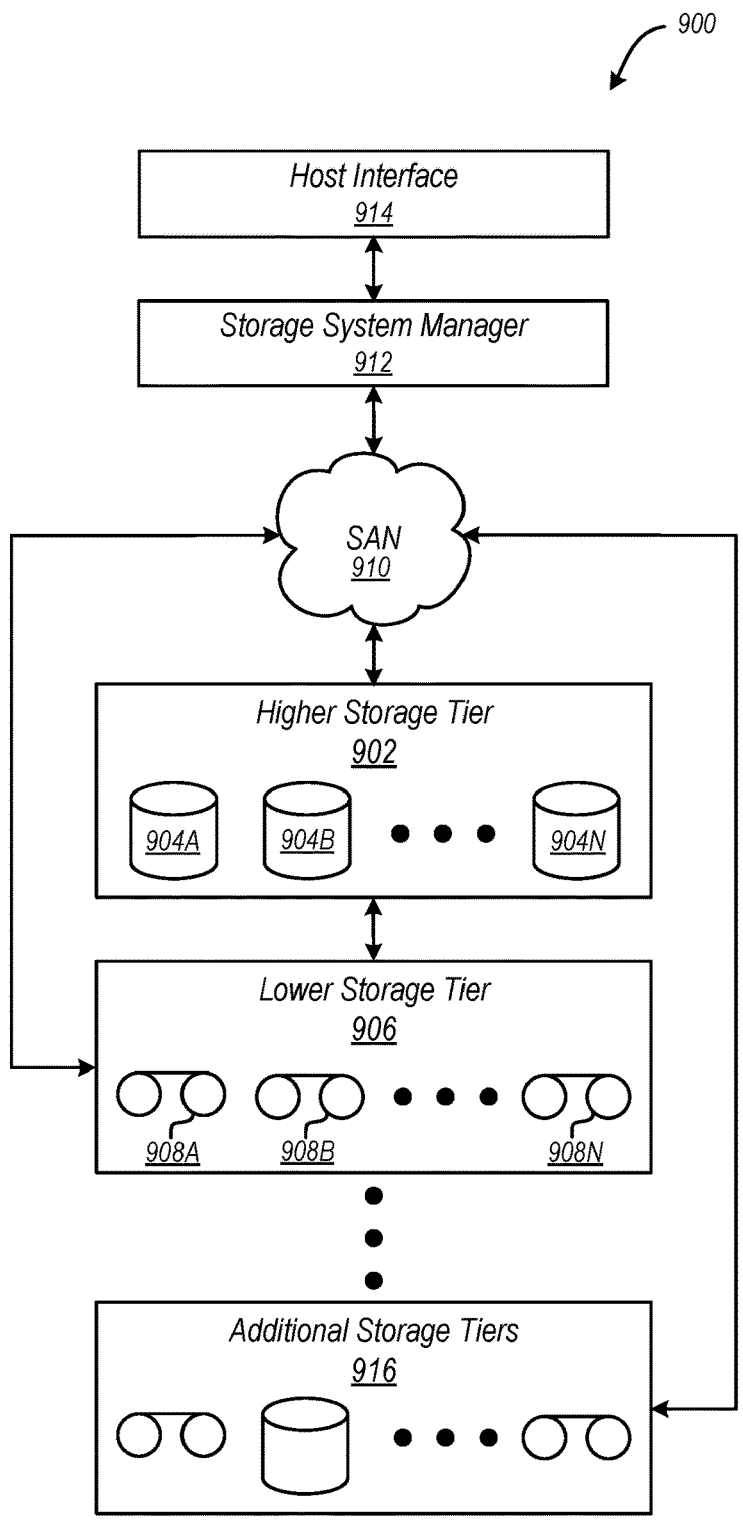
FIG. 9 illustrates a tiered data storage system in accordance with one embodiment.

Now referring to FIG. 9, a storage system 900 is shown according to one embodiment. Note that some of the elements shown in FIG. 9 may be implemented as hardware and/or software, according to various embodiments. In some approaches, the storage system 900 may be implemented in an automated data storage library such as that shown in FIGS. 1-2. In other approaches, an automated data storage library such as that shown in FIGS. 1-2 may be a tier of the storage system 900.

The storage system 900 may include a storage system manager 912 for communicating with a plurality of media on at least one higher storage tier 902 and at least one lower storage tier 906. The higher storage tier(s) 902 preferably may include one or more random access and/or direct access media 904A, 904B, . . . , 904N, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 906 may preferably include one or more lower performing storage media 908A, 908B, . . . , 908N, including sequential access media such as magnetic tape in tape drives and/or optical media, slower accessing HDDs, slower accessing SSDs, etc., and/or others noted herein or known in the art. One or more additional storage tiers 916 may include any combination of storage memory media as desired by a designer of the system 900. Also, any of the higher storage tiers 902 and/or the lower storage tiers 906 may include some combination of storage devices and/or storage media.

The storage system manager 912 may communicate with the storage media 904A, 904B, . . . , 904N, and 908A, 908B, . . . , 908N on the higher storage tier(s) 902 and lower storage tier(s) 906 through a network 910, such as a storage area network (SAN), as shown in FIG. 9, or some other suitable network type. The storage system manager 912 may also communicate with one or more host systems (not shown) through a host interface 914, which may or may not be a part of the storage system manager 912. The storage system manager 912 and/or any other component of the storage system 900 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 900 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 902, may include a majority of SSD storage media for storing data in a higher performing storage environment, and remaining storage tiers, including lower storage tier 906 and additional storage tiers 916 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 902, while data not having one of these attributes may be stored to the additional storage tiers 916, including lower storage tier 906. Of course, one of skill in the art, upon reading the present descriptions, may devise many other combinations of storage media types to implement into different storage schemes, according to the embodiments presented herein.

According to some embodiments, the storage system (such as 900) may include logic configured to receive a request to open a data set, logic configured to determine if the requested data set is stored to a lower storage tier 906 of a tiered data storage system 900 in multiple associated portions, logic configured to move each associated portion of the requested data set to a higher storage tier 902 of the tiered data storage system 900, and logic configured to assemble the requested data set on the higher storage tier 902 of the tiered data storage system 900 from the associated portions. Of course, this logic may be implemented as a method on any device and/or system or as a computer program product, according to various embodiments.

Various embodiments described herein may implement media of various types, including optical and tape media. By way of example only, and solely to place various embodiments in a context, much of the following description is presented in exemplary embodiments revolving around tape storage. Again, this is done by way of example only.

According to an example, tape storage may be divided into two main service levels, the first of which includes tapes residing in a tape library, e.g., such that an automated picker may retrieve a tape for mounting in a drive to provide access to specific data within a tape residing in the tape library on the order of minutes, depending on overall system load. The other service level may include tapes stored outside the tape library, e.g., such that a tape is mounted, imported into the tape library, exported from the tape library, etc., by a human being or free roaming robot. Media retrieval at this service level may take hours, depending on overall system load and/or the human or free roaming robot.

However, previous attempts to store data on removable media, e.g., such as magnetic tapes, residing outside a library have faced unique issues. For instance, since data stored on a medium located outside a library typically takes much longer to access than data stored on a medium located in the library, removable media exported from the library are filled so as to cost efficiently use the space available on the medium being exported. Additionally, media used to store data outside a library is preferably less expensive than media used in the library. Therefore, using magnetic disks to store data outside a library is not cost effective, and a less expensive storage scheme is preferred.

Various embodiments described herein introduce tiered data storage schemes which efficiently integrate the storage of data on media positioned in a library (e.g., a first tier) and the storage of data on media positioned outside a library (e.g., as a second tier). More specifically, various embodiments included herein include data libraries having improved metadata indexing. By indexing the metadata which corresponds to data stored in a library, specific data may more efficiently be retrieved and read, e.g., upon request, as will be described in further detail below.

Figure 10:
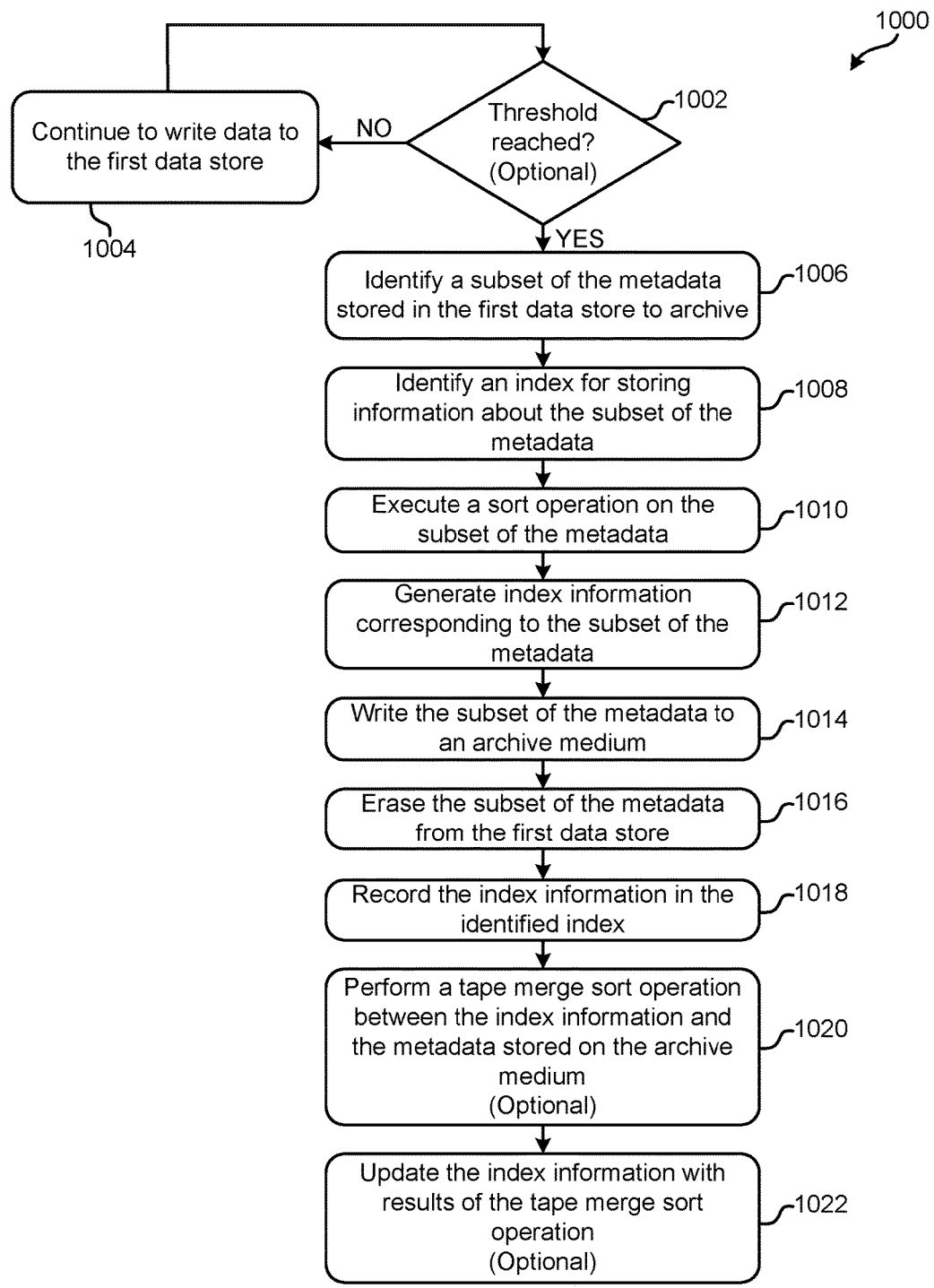
FIG. 10 is a flowchart of a method in accordance with one embodiment.

Now referring to FIG. 10, a flowchart of a method 1000 for indexing metadata stored in a storage library is shown according to one embodiment. The method 1000 may be performed in accordance with the present invention in any of the environments depicted in FIGS. 1-9, among others, in various embodiments. Of course, more or less operations than those specifically described in FIG. 10 may be included in method 1000, as would be understood by one of skill in the art upon reading the present descriptions.

Each of the steps of the method 1000 may be performed by any suitable component of the operating environment. For example, in various embodiments, the method 1000 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 1000. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 10, optional decision 1002 of method 1000 determines whether an amount of metadata stored in a first data store has reached a threshold. Again, the metadata may corresponds to data stored in a library. Examples of metadata are provided below.

According to an illustrative approach which is in no way intended to limit the invention, the first data store may be a magnetic disk, memory, NVM drive, etc. in a storage library; a host; etc. Thus, decision 1002 may include determining whether an amount of metadata stored on a magnetic disk in a storage library has reached a threshold. Moreover, the threshold may be predetermined, calculated in real time, periodically updated (e.g., based on storage library conditions), set by a user, dependent upon the amount of available storage in the first data store, etc., depending on the desired embodiment. It should also be noted that "reached a threshold" is in no way intended to limit the invention. Rather than determining whether a value has reached a threshold, equivalent determinations may be made, e.g., as to whether a value is within a predetermined range, having a value outside a predetermined range, having an absolute value above a threshold, having a value below a threshold, etc., depending on the desired approach. Moreover, in other approaches the first data store may be a magnetic tape in a tape library, non-volatile random-access memory (NVRAM), etc.

As previously mentioned, data is preferably stored in a storage library, e.g., because the data is more easily accessible. However, as storage space in a given medium, or the library itself, becomes limited, at least some of the data may be migrated to a medium outside the library, thereby freeing some storage space in the library which may be used to store other data (e.g., newer, more important, hotter, etc., data). Accordingly, determining whether an amount of metadata stored in a first data store has reached a threshold may allow a storage library to migrate at least some of the data in the storage library to a location outside the library, thereby preferably avoiding a situation where the first data store is completely filled and additional storage operations are unable to be performed.

Looking to operation 1004, data may continue to be written to the first data store in response to determining that the amount of metadata stored in the first data store has not reached the threshold. In other words, the storage library may continue to operate normally in response to determining that the amount of metadata stored in the first data store has not reached the threshold. Moreover, method 1000 may return to decision 1002 after an amount of time, upon request, immediately, in response to receiving a write request, etc., such that another determination may be made as to whether an amount of metadata stored in a first data store has reached the threshold.

Operation 1006 includes identifying a subset of metadata stored in the first data store to archive in response to determining that an amount of metadata stored in the first data store has reached a threshold, e.g., the threshold of decision 1002 if performed, or some other predefined threshold. The subset of the metadata may be identified using one or more criteria depending on the desired embodiment. For instance, the subset of the metadata identified to archive may be the oldest 20% of the metadata stored in the first data store. In the present description, "oldest" may refer to the metadata which was written to the medium the longest amount of time ago. According to another approach, the subset of the metadata identified to archive may be the coldest 20% of the metadata stored in the first data store. In the present description, "coldest" may refer to the metadata which was accessed (e.g., read) the longest amount of time ago. Moreover, in other approaches, the subset of the metadata identified for archiving may be the least important (e.g., unnecessary), most redundant, least reliable, etc., 20% of the metadata stored in the first data store. It should also be noted that the amount of metadata identified for archiving is not limited to an identified 20% of the metadata stored in the first data store. In other approaches, 10%, 15%, 28%, 25%, 30%, 50%, etc. of the metadata stored in the first data store may be identified in operation 1006, but could be higher or lower depending on the desired embodiment.

In some approaches, the subset of the metadata may be identified as a result of an explicit request (e.g., from a user). However, in other approaches, the subset of the metadata may be identified as a result of a predefined condition being met, e.g., a controller being set to automatically select the oldest, coldest, least important, etc. given percent of the metadata in the first data store in response to detecting the first data store has been filled past a certain amount (e.g., threshold). In some approaches a removable storage medium inventory mechanism may be implemented.

Referring still to method 1000, operation 1008 includes identifying an index (e.g., at least one index) for storing information about the subset of the metadata determined in operation 1006. According to the present description, an index may be used to sort data based on information relating to the data. For example, an index which pertains to dates may be used to store dates associated with metadata entries of the subset, thereby preferably allowing for a specific metadata entry to be efficiently located based on a date associated therewith. In different approaches, an index may pertain to a date, a user group, a geographical area, a hash of an identification of the data which the subset of the metadata corresponds to (e.g., a unique identifier such as a file path and/or name, an object ID, etc.), etc. In some approaches, a hash of an identification may be performed by using a known function which is able to map data of an arbitrary size to data of a fixed size, as would be appreciated by one skilled in the art upon reading the present description. Moreover, the indexes may be integrated as part of an existing index, implemented using a single supplemental index, implemented using individual supplemental indexes, etc., depending on the desired embodiment.

Operation 1010 further includes executing a sort operation on the subset of the metadata to index. Thus, operation 1010 may include sorting the subset of metadata based on the at least one index type identified in operation 1008. According to various embodiments, any sort operation which would be apparent to one skilled in the art upon reading the present description may be used. Moreover, in some approaches, a cache may be used to perform the sort operation, e.g., to organize the subset of the metadata prior to writing the subset to an archive medium, as will soon become apparent.

Index information corresponding to the subset of the metadata is generated in operation 1012. The generated index information may be based on and/or includes a date, a user group, a geographical area or region, a hash of an identification of the data which the subset of the metadata corresponds to (e.g., a unique identifier such as a file path and/or name, an object ID, etc.), etc., or combinations thereof. It follows that index information corresponding to metadata may be generated by examining the metadata and/or the data itself which is associated with the metadata. Moreover, the type of index information generated may depend on the metadata and/or the data itself. For example, index information which is based on and/or includes a date may be used where it is known that the query will be for metadata and/or data archived during a certain time and/or date range. For instance, index information which is based on and/or includes a date may work well for metadata and/or the data naturally associated with dates (e.g., surveillance footage for a certain time period, bank statements for a certain month, etc.). According to another example, index information which is based on and/or includes a user group may be used where it is known that the query will be for metadata and/or data which is divided and grouped according to the user group (e.g., a specific business department).

Method 1000 further includes writing the subset of the metadata to an archive medium, e.g., a removable storage medium which may include a magnetic tape, an optical disk, etc. See operation 1014. The subset of the metadata may be written to the archive medium in the library. According to an example, which is in no way intended to limit the invention, the subset of the metadata may be written to a magnetic tape by a tape drive in a tape library. The subset of the metadata is preferably written to the archive medium such that the subset of the metadata is collocated on the archive medium. This may allow for each portion of the subset of the metadata and/or portions of other archived subsets of metadata to be located in about the same location on the archive medium, thereby improving organization of the metadata on the archive medium. For example, if the coldest 20% of the metadata on a disk is being migrated to a removable storage medium (e.g., a magnetic tape, optical disk, etc.), it may be preferred that the 20% of the metadata is located at about the same location on the removable storage medium, because data entries having about the same temperature may have about the same probability of being requested. In other words, metadata may be collocated on the removable storage medium so that it may be optimally located for future recall operations (e.g., see FIG. 11 below). However, in other approaches, the subset of the metadata may be written to the archive medium such that the subset of the metadata is not collocated on the archive medium, e.g., in the event that space on the archive medium is limited, in the event that the metadata overflows to a next archive medium, etc.

As mentioned above, a cache may be used to organize the subset of the metadata prior to writing the subset to an archive medium. According to an illustrative approach, metadata identified to be archived may enter a cache (e.g., a staging service) that organizes the metadata. The cache may be able to organize the metadata such that more than one (e.g., several) removable storage media are written to at the same time. Moreover, collocation directives may be used to place the metadata on the desired removable storage medium, preferably such that an improved sequencing is achieved. According to an example, a staging service may involve a disk and/or memory-based cache which efficiently uses the tape drives of a tape library to write to removable tapes, thereby preferably also allowing for better collocation optimization. Moreover, in some approaches, the identified subset of metadata may be stored with standard metadata (e.g., Linear Tape File System metadata).

It may also be preferred that operation 1014 is performed after the index information corresponding to the subset has been generated (e.g., after operation 1012 has been performed), such that the index information is available for future use. However, in other approaches index information may be generated at a later point in time, e.g., using the subset of the metadata before it is actually erased from the first data store. It should be noted that operation 1014 may, in some approaches, essentially only make a copy of the subset of metadata on the archive medium and therefore the subset of the metadata will remain on the first data store until it is actually erased therefrom. Thus, looking to operation 1016, the subset of the metadata is erased from the first data store.

The removable storage medium is preferably filled as full as possible before being exported from the library, but need not be. As a result, memory on the removable storage medium may be efficiently used while also minimizing the number of times the removable storage medium is imported into the library. It follows that the removable storage medium may remain in the library until it is filled as full as possible, after which it may be exported to a storage location outside the library, e.g., by bulk tagging the removable storage medium for export, as would be apparent to one skilled in the art upon reading the present description. However, a removable storage medium may be exported from the library before being filled completely or as full as possible, e.g., depending on available space in the library, available throughput, etc. According to some approaches, certain removable storage media may be designated as being for storing metadata. However, in other approaches storage media may be repurposed for storing metadata as they are needed.

With continued reference to FIG. 10, operation 1018 includes recording the index information in the identified index (e.g., see operation 1008 above). As mentioned above, the one or more indexes identified for a given embodiment may be implemented as part of an existing index, implemented in a single supplemental index, implemented using individual supplemental indexes, etc. Thus, in some approaches, operation 1018 may include recording the index information in the identified existing index on the first data store (e.g., main server). As a result, the index information may be accessed efficiently (quickly), thereby allowing for the metadata corresponding thereto to be accessed efficiently as well, despite the possibility of the metadata being located on a removable storage medium outside the library.

Depending on the type of index identified, different index information may be used. As previously mentioned, the index information may be based on and/or include a date, a user group, a geographical area, a hash of an identification of the data which the subset of the metadata corresponds to (e.g., a unique identifier such as a file path and/or name, an object ID, etc.), etc., or combinations thereof. It follows that in some approaches, it may be preferred to record a range of the index information pertaining to a subset of metadata rather than each of the individual index information data points.

According to an example, which is in no way intended to limit the invention, the identified index may pertain to dates. Thus, the index information stored in the identified index may be based on and/or include a date associated with each of the metadata entries in the subset. Rather than storing each date associated with each of the metadata entries, operation 1018 may simply include recording a date range which includes all the dates associated with the metadata entries in the subset. For example, dates such as the following may be generated as index information pertaining to a subset of metadata: Feb. 2, 2011; Feb. 3, 2011; Feb. 5, 2011; Feb. 9, 2011; Feb. 10, 2011. Rather than storing each of the aforementioned dates in the identified index, a range of Feb. 2, 2011-Feb. 10, 2011 may be entered, e.g., to reduce the amount of memory used on the identified index.

Referring still to method 1000, optional operations 1020, 1022 are shown. Optional operation 1020 includes performing a merge sort operation between the index information and the metadata stored on the archive medium. According to one approach, the merge sort operation may include performing a tape merge sort operation, e.g., depending on the type of removable media used. Moreover, optional operation 1022 includes updating the index information with results of the merge sort operation. As metadata and/or the data which the metadata corresponds to changes over time (e.g., is updated, condensed, moved, replaced, deleted, etc.), it is preferred that the index information accurately corresponds to the metadata in addition to the metadata accurately corresponding to the data. For example, if a data entry is updated (e.g., the value is changed), the metadata corresponding thereto may be updated as well, whereby the index information may also be updated to reflect the updates made to the metadata. Accordingly, it is preferred that the index information corresponding to the metadata is reconciled such that the changes to the data and metadata are represented by the index information as well. In some approaches, as changes are made to the data and/or metadata, the changes may be stored in memory (e.g., cached to a disk), which may also be checked. Moreover, when enough changes have been made to warrant rewriting the metadata on removable media, rewrites may then be performed. According to one example, metadata which has been deleted may simply be invalidated on the removable storage medium. Although invalidated, the "deleted" metadata may remain on the removable storage medium until a large enough percentage of the metadata on that removable storage medium has been identified as having been deleted that importing the removable storage medium and recycling the metadata through the staging service to be exported from the library again is warranted. This can be more efficient and may suffice as a mechanism for end-of-life management of sufficiently old data.

According to some approaches, one or both of the optional operations 1020, 1022 may be performed during an update (e.g., refresh) process. Update processes may be performed periodically (e.g., once a month), upon request, after a condition has been meet (e.g., a predetermined amount of data and/or metadata has been invalidated), etc. Accordingly, update processes may be performed on the index information less frequently than the metadata and/or the data itself is updated. Moreover, as mentioned above the merge sort operation of optional operation 1020 may include performing a tape merge sort operation which may be of a type known in the art, e.g., such as a reconcile merge operation.

As mentioned above, improved metadata indexing, e.g., as described in some of the embodiments herein, may allow for specific data to be more efficiently retrieved and read. Looking to FIG. 11, a flowchart of a method 1100 for recalling data stored in a storage system using indexed metadata, is illustrated according to one embodiment. The method 1100 may be performed in accordance with the present invention in any of the environments depicted in FIGS. 1-10, among others, in various embodiments. Of course, more or less operations than those specifically described in FIG. 11 may be included in method 1100, as would be understood by one of skill in the art upon reading the present descriptions.

Each of the steps of the method 1100 may be performed by any suitable component of the operating environment. For example, in various embodiments, the method 1100 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 1100. Illustrative processors include, but are not limited to, a central processing unit (CPU), an application specific integrated circuit (ASIC), a field programmable gate array (FPGA), etc., combinations thereof, or any other suitable computing device known in the art.

Figure 11:
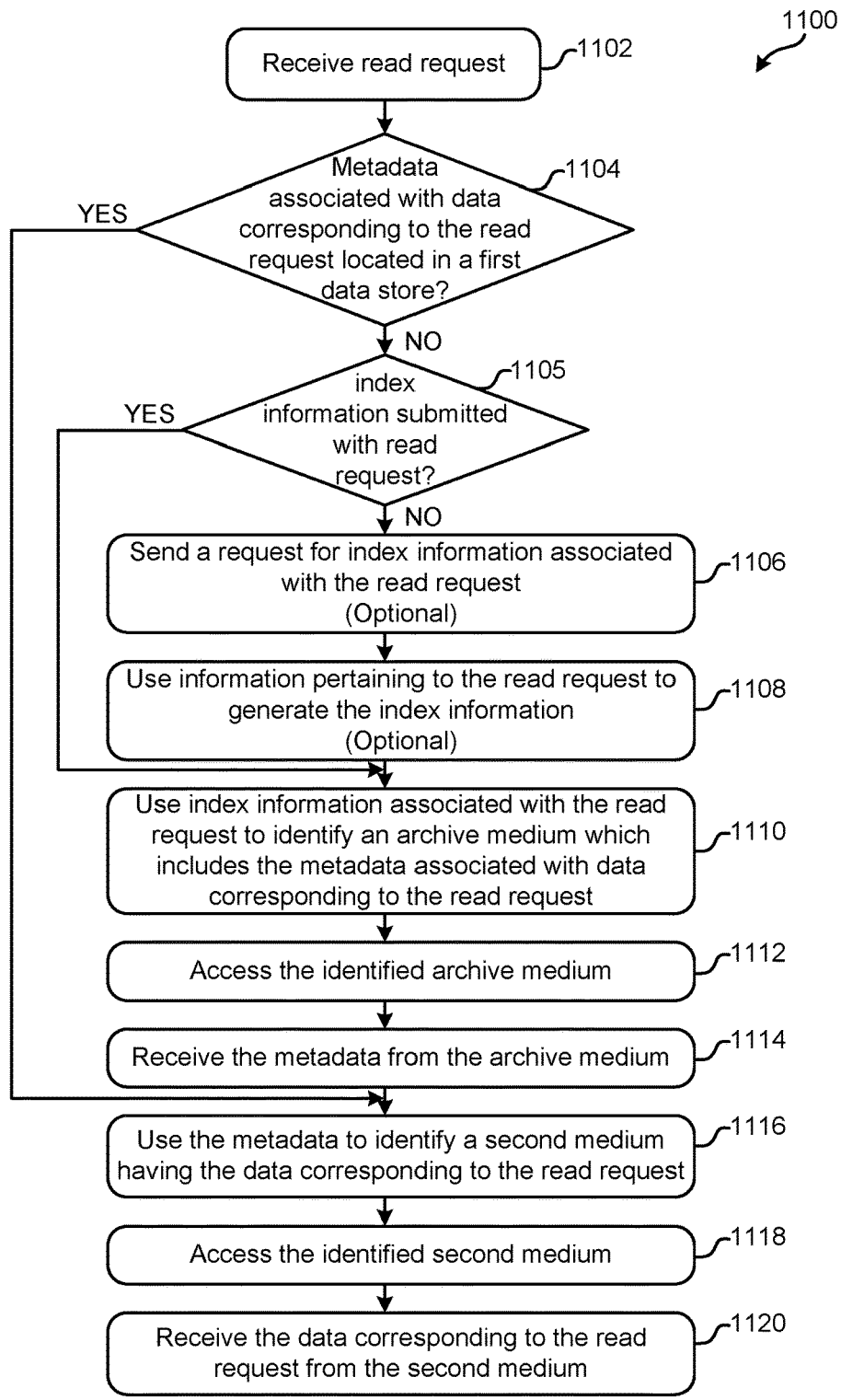
FIG. 11 is a flowchart of a method in accordance with one embodiment.

As shown in FIG. 11, operation 1102 of method 1100 includes receiving a read request. In response to receiving the request, operation 1104 includes determining whether metadata associated with data corresponding to the read request is located in a first data store. As mentioned above, the first data store may include a magnetic disk; however, in other approaches the first data store may include any desired type of medium (e.g., a magnetic tape, an optical disk, etc.).

In response to determining that metadata associated with data corresponding to the read request is not located in a first data store, method 1100 may proceed to decision 1105 which includes determining whether index information associated with the read request has been submitted with the read request received. In response to determining that index information associated with the read request has not been submitted with the read request, method 1100 may proceed to optional operation 1106.

Optional operation 1106 includes sending a request for index information associated with the read request in response to determining that that the metadata is not located in the first data store. The request sent in optional operation 1106 may preferably result in the requested index information being received. As previously mentioned, index information may desirably be used to locate metadata, even when the metadata is stored outside a library, e.g., on a removable storage medium. Thus, optional operation 1106 may be performed in situations where the index information was not already submitted with the read request.

Moreover, optional operation 1108 includes using information pertaining to the read request to generate the index information in response to determining that that the metadata is not located in the first data store. According to one example, generating the index information may be performed by assuming geographical area and/or region index information corresponding to the metadata based on the geographical area and/or region the read request was received from. In another example, user based index information corresponding to the metadata may be generated based on the user from which the read request was received. Again, index information may be useful when locating metadata. Thus, index information may be generated in place of, or in addition to, requesting for index information when the index information was not already submitted with the read request.

However, returning to decision 1105, method 1100 may jump to operation 1110 in response to determining that index information associated with the read request has been submitted with the read request, e.g., whereby the index information may be used. It follows that index information associated with the read request may be submitted with the read request itself. Therefore, optional operations 1106, 1108 may not be performed in embodiments where the index information is provided with the read request received in operation 1102. Thus, both or neither of the optional operations 1106, 1108 may be performed, e.g., depending on the desired embodiment.

It should be noted that in some approaches, index information may not be available. According to an example, index information may not be submitted with the read request received and optional operations 1106, 1108 may not result in index information being provided. In such approaches, the read request may be performed without using index information, e.g., by searching through metadata sequentially, searching through the data sequentially, etc. However, in some approaches, the read request may simply be denied.

Referring still to FIG. 11, method 1100 further proceeds to operation 1110 in response to determining that the metadata associated with data corresponding to the read request is not located in the first data store. Operation 1110 includes using index information associated with the read request to identify an archive medium which includes the metadata associated with data corresponding to the read request. As metadata is moved off the first data store, it is written to removable storage media which may then be stored outside a storage library. Index information corresponding to the metadata moved outside the storage library is preferably kept in an index, e.g., as described above. Moreover, the index information may be based on and/or include at least one of: a date, a user group, a geographical area, a hash of an identification of the data which the read request corresponds to (e.g., a unique identifier such as a file path and name, object ID, etc.), etc., e.g., depending on the desired embodiment.

The index storing the index information may be part of a main metadata server, e.g., a magnetic disk stored in the library. Depending on the approach, the index storing the index information may be integrated as part of an existing index, implemented using a single supplemental index, implemented using individual supplemental indexes, etc.

Operation 1112 includes accessing the identified archive medium, while operation 1114 includes receiving (e.g., reading) the metadata from the archive medium. Once received, the metadata may be used to identify a second medium having the data corresponding to the read request. See operation 1116. Returning momentarily to decision 1105, method 1100 may skip to operation 1116 in response to determining that the metadata associated with data corresponding to the read request is located in the first data store. Because the metadata associated with data corresponding to the read request may be accessed from the first data store, the intervening operations may not be desirable for such approaches, and method 1100 may proceed accordingly.

In some approaches, the second medium identified in operation 1116 may be a removable storage medium stored outside a storage library. Thus, operation 1118 includes accessing the identified second medium, e.g., by importing the identified second medium into the storage library. Depending on the type of medium identified and/or the location where the second medium is stored, operation 1118 may include different processes. According to an example, the identified second medium may be a magnetic tape stored outside a tape library. Thus, operation 1118 may include importing the identified magnetic tape into the tape library, e.g., via an I/O station and/or interface, and loading the magnetic tape in a tape drive. In another example, more than one second medium may be identified, whereby operation 1118 may include performing a bulk import operation, as would be apparent to one skilled in the art upon reading the present description.

With continued reference to FIG. 11, the data corresponding to the read request may be received from the second medium. See operation 1120. Depending on the type of removable storage medium the second medium corresponds to, the data corresponding to the read request may be accessed (e.g., read) differently. According to an example, the second medium may be a magnetic tape. Thus, the data corresponding to the read request may be read from the magnetic tape, e.g., by performing a high speed location operation (e.g., a coarse locate operation) to a region of the tape identified by the metadata as having the data corresponding to the read request, and reading the data upon locating a beginning thereof.

Once the data corresponding to the read request is received from the second medium, the data may be transmitted to the source of the read request. Moreover, upon sending the data, the system may return (e.g., export) the second medium and/or the archive medium to the storage locations outside the library from where they were retrieved.

Data may be written to a tiered data storage library as described herein by storing the written data to a medium using conventional methods, e.g., Linear Tape File System (LTFS) Enterprise Edition (EE), as would be apparent to one skilled in the art upon reading the present description. Moreover, once the data has been written to a medium, method 1000 as described above may be performed, e.g., to determine how metadata and/or index information should be stored.

It should also be noted that any one or more of the approaches described herein may be implemented to create backup copies of certain data in a library. In other words, any one or more of the approaches described herein may be implemented to create backup copies on a lower storage tier of certain data stored on a higher storage tier. Accordingly, data stored on a removable storage medium may mirror the data stored on a medium in the library. According to one approach, removable storage media outside the library may be recycled, e.g., by tagging the removable storage media to be remounted in a library at the convenience of a tape operator. The operator may then perform this request as a part of another operation and/or at non-peak load times.

As mentioned above, various embodiments described herein may be able to archive data as well as the metadata corresponding thereto such that the metadata and thus the data are indexed. Tiered data storage schemes as described in various embodiments herein are able to efficiently integrate the storage of data on removable storage media positioned in a library and the storage of data on removable storage media positioned outside a library. By indexing the metadata on a higher tier, while the metadata and corresponding data are stored on a lower tier in a library, specific data may more efficiently be retrieved and read. Moreover, by writing to and/or updating an index on a higher tier having information about metadata stored in one or more data storage media on a lower tier, a reduced amount of space is used on the higher tier, thereby further improving efficiency.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

A data processing system suitable for storing and/or executing program code may include at least one processor, which may be or be part of a controller, coupled directly or indirectly to memory elements through a system bus, such as controller 400 of FIG. 4. The memory elements can include local memory employed during actual execution of the program code, such as nonvolatile memory 404 of FIG. 4, bulk storage, and cache memories which provide temporary storage of at least some program code in order to reduce the number of times code must be retrieved from bulk storage during execution.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer-implemented method for indexing metadata which corresponds to data stored in a storage system, comprising:
   identifying a subset of metadata stored in a first data store to archive in response to determining that an amount of metadata stored in the first data store has reached a threshold;
   identifying an index for storing information about the subset of the metadata;
   executing a sort operation on the subset of the metadata;
   generating index information corresponding to the subset of the metadata;
   writing the subset of the metadata to an archive medium; and
   recording the index information in the identified index.

2. The method as recited in claim 1, comprising performing a merge sort operation between the index information and the metadata stored on the archive medium.

3. The method as recited in claim 2, comprising updating the index information with results of the merge sort operation.

4. The method as recited in claim 1, wherein the generated index information is selected from the group consisting of: a date, a user group, a geographical area, and a hash of an identification of the data which the subset of the metadata corresponds to, wherein recording the index information in the identified index reduces data access times for the data stored in the storage system.

5. The method as recited in claim 4, wherein the generated index information is based on or includes the hash of the identification.

6. The method as recited in claim 1, wherein the archive medium is a removable storage medium.

7. The method as recited in claim 1, wherein the identified subset includes the coldest metadata stored in the first data store.

8. The method as recited in claim 1, wherein the identified subset includes the oldest metadata stored in the first data store.

9. The method as recited in claim 1, wherein the subset of the metadata is collocated on the archive medium.

10. A computer program product for recalling data stored in a storage system using indexed metadata, the computer program product comprising a computer readable storage medium having program instructions embodied therewith, wherein the computer readable storage medium is not a transitory signal per se, the program instructions executable by a computer to cause the computer to perform a method comprising:
receiving, by the computer, a read request;
determining, by the computer, whether metadata associated with data corresponding to the read request is located in a first data store;
using, by the computer, index information associated with the read request to identify an archive medium which includes the metadata associated with data corresponding to the read request in response to determining that the metadata is not located in the first data store;
receiving, by the computer, the metadata from the archive medium;
using, by the computer, the metadata to identify a second medium having the data corresponding to the read request; and
receiving, by the computer, the data corresponding to the read request from the second medium.

11. The computer program product as recited in claim 10, comprising sending, by the computer, a request for the index information in response to determining that that the metadata is not located in the first data store.

12. The computer program product as recited in claim 10, comprising using, by the computer, information pertaining to the read request to generate the index information in response to determining that that the metadata is not located in the first data store.

13. The computer program product as recited in claim 10, wherein the archive medium is a removable storage medium.

14. The computer program product as recited in claim 10, wherein the index information is selected from a group consisting of: a date, a user group, a geographical area, and a hash of an identification of the data which the read request corresponds to, wherein using the index information associated with the read request to identify an archive medium which includes the metadata associated with data corresponding to the read request reduces a data access time for the data corresponding to the read request.

15. The computer program product as recited in claim 14, wherein the index information is based on or includes the hash of the identification.

16. A system, comprising:
a processor and logic integrated with and/or executable by the processor, the logic being configured to:
identify, by the processor, a subset of metadata stored in a first data store to archive in response to determining that an amount of metadata stored in the first data store has reached a threshold;
identify, by the processor, an index for storing information about the subset of the metadata;
execute, by the processor, a sort operation on the subset of the metadata;
generate, by the processor, index information corresponding to the subset of the metadata;
write, by the processor, the subset of the metadata to an archive medium; and
record, by the processor, the index information in the identified index.

17. The system as recited in claim 16, comprising:
performing a merge sort operation between the index information and the metadata stored on the archive medium; and
updating the index information with results of the merge sort operation.

18. The system as recited in claim 16, wherein the generated index information is selected from the group consisting of: a date, a user group, a geographical area, and a hash of an identification of the data which the subset of the metadata corresponds to, wherein recording the index information in the identified index reduces data access times for data stored in the storage system.

19. The system as recited in claim 16, wherein the identified subset includes the coldest metadata stored in the first data store.

20. The system as recited in claim 16, further comprising:
a drive mechanism for passing a magnetic medium over a magnetic head; and
a controller electrically coupled to the magnetic head.

* * * * *